United States Patent [19]
Barbee et al.

[11] Patent Number: 6,071,988
[45] Date of Patent: Jun. 6, 2000

[54] POLYESTER COMPOSITE MATERIAL AND METHOD FOR ITS MANUFACTURING

[75] Inventors: Robert Boyd Barbee; James Christopher Matayabas, Jr.; John Walker Gilmer, all of Kingsport, Tenn.

[73] Assignee: Eastman Chemical Company, Kingsport, Tenn.

[21] Appl. No.: 08/995,325

[22] Filed: Dec. 22, 1997

Related U.S. Application Data

[60] Provisional application No. 60/052,054, Jul. 9, 1997, and provisional application No. 60/034,134, Dec. 31, 1996.

[51] Int. Cl.⁷ ............................................. C08K 9/10
[52] U.S. Cl. .......................... 523/210; 501/148; 524/243; 524/445
[58] Field of Search ............................. 523/210; 524/445, 524/243; 501/148

[56] References Cited

U.S. PATENT DOCUMENTS

| | | |
|---|---|---|
| 2,531,427 | 5/1950 | Hanser . |
| 2,966,506 | 12/1960 | Jordan et al. . |
| 3,514,498 | 5/1970 | Okazaki et al. ........................ 260/857 |
| 4,081,496 | 3/1978 | Finlayson . |
| 4,105,578 | 8/1978 | Finlayson et al. . |
| 4,116,866 | 9/1978 | Finlayson . |
| 4,208,218 | 6/1980 | Finlayson . |
| 4,391,637 | 7/1983 | Mardis et al. . |
| 4,410,364 | 10/1983 | Finlayson et al. . |
| 4,412,018 | 10/1983 | Finlayson et al. . |
| 4,434,075 | 2/1984 | Mardis et al. . |
| 4,434,076 | 2/1984 | Mardis et al. . |
| 4,450,095 | 5/1984 | Finlayson . |
| 4,517,112 | 5/1985 | Mardis et al. . |
| 4,600,409 | 7/1986 | Campbell ..................................... 44/71 |
| 4,677,158 | 6/1987 | Tso et al. . |
| 4,739,007 | 4/1988 | Okada et al. . |
| 4,769,078 | 9/1988 | Tso et al. . |
| 4,889,885 | 12/1989 | Usuki et al. . |
| 5,110,501 | 5/1992 | Knudson et al. . |
| 5,164,460 | 11/1992 | Yano et al. . |
| 5,334,241 | 8/1994 | Jordan . |
| 5,336,647 | 8/1994 | Nae et al. . |
| 5,429,999 | 7/1995 | Nae et al. . |
| 5,728,764 | 3/1998 | Bauer et al. ............................. 524/451 |

FOREIGN PATENT DOCUMENTS

| | | |
|---|---|---|
| 9-176461 | 7/1997 | Japan . |
| 93/04118 | 3/1993 | WIPO . |
| 96/08526 | 3/1996 | WIPO . |
| 97/31057 | 2/1997 | WIPO . |
| 97/31973 | 2/1997 | WIPO . |

*Primary Examiner*—Veronica P. Hoke
*Attorney, Agent, or Firm*—Karen A. Harding; Harry J. Gwinnell

[57] ABSTRACT

The present invention relates to a composition comprising platelet particles treated with at least one polyalkoxylated ammonium salt comprising at least one polyalkoxylated group consisting of greater than 5 repeating alkyl oxide groups. The treated particles of the present invention display particularly good dispersion when incorporated into various polyester compositions at concentrations up to about 25 weight %. Also disclosed is a process incorporating said treated platelet particles into a polyester and for forming said treated platelet particles.

28 Claims, 1 Drawing Sheet

POLYESTER COMPOSITE MATERIAL AND METHOD FOR ITS MANUFACTURING

RELATED APPLICATIONS

This application claims the benefit of provisional application U.S. Ser. No. 60/052,054 filed on Jul. 9, 1997 and U.S. Ser. No. 60/034,134, filed Dec. 31, 1996.

BACKGROUND OF THE INVENTION

There is much interest in layered clay based polymer nanocomposites because of the improved properties exhibited by the nanocomposites when compared to the pure polymer. It is widely known, however, that some mechanical properties, such as elongation-at-break, are often reduced considerably upon the addition of the clay. It is desirable to maximize delamination of the platelet particles into individual platelets in order to maximize sorte property improvements, including barrier improvements, and to minimize deleterious effects on some properties including elongation-at-break.

This invention relates to processes to prepare polyester composite compositions and to polyester composite materials which comprise a polyester polymer and a swellable layered clay mineral that has been intercalated with polyalkoxylated ammonium salts.

The polyester composite materials of this invention are useful for forming packages that have improved gas barrier properties. Containers made from these polyester composite materials are ideally suited for protecting consumable products, such as foodstuffs, soft drinks, and medicines.

U.S. Pat. No. 4,739,007 discloses polyamide composite materials containing layered clay mineral intercalated with organic onium salis. Polyalkoxylated ammonium salts as disclosed in this invention report were not described.

U.S. Pat. No. 5,164,460 discloses polyimide composite materials containing ayered clay mineral intercalated with organic onium salts. Polyalkoxylated ammonium salts as disclosed in this invention report were not described.

WO 93/04118 relates to an extrusion compounding process for forming polymeric composites which are comprised of platelet particles containing organic onium salts and dispersed in a polymeric matrix. Polyalkoxylated ammonium salts as disclosed in this invention were not described. Further, as shown in the present Examples, extrusion compounding processes alone do not provide polyester composites containing mostly individual platelet particles.

U.S. Pat. No. 4,889,885 describes the polymerization of various vinyl monomers such as methyl methacrylate and isoprene in the presence of sodium montmorillonite. In Example 11, it describes the polycondensation of dimethyl terephthalate and ethylene glycol in the presence of 33 weight percent of a montmorillonite clay in water to provide 6.2 wt % clay in the final composite. Water or alcohol is needed in this process as a medium for predispersion of the clay to allow intercalation by monomer. It is known that the addition of water to dimethyl terephthalate and ethylene glycol preparations of PET reduces the rate of reaction, reduces the I.V. that can be attained, and often produces haze.

U.S. Pat. No. 5,336,647 and 5,429,999 describe the preparation of layered clays containing polyalkoxylated ammonium salts. Use of these clays in polyesters was not recognized.

Among the numerous patents that describe the preparation of layered clays containing ammonium salts are U.S. Pat. Nos. 2,531,427; 2,966,506; 4,081,496; 4,105,578; 4,116,866; 4,208,218; 4,391,637; 4,410,364; 4,412,018; 4,434,075; 4,434,076; 4,450,095; 4,517,112; 4,677,158; 4,769,078; 5,110,501; and 5,334,241.

JP Kokai patent no. 9-176461 discloses polyester bottles wherein the polyester contains swellable laminar silicate. WO 97/31057 discloses polymer composites having dispersed therein inorganic material such as clay which is separated with an inorganic intercalant. WO 97/31973 discloses producing a composite material by mixing a potassium ionomer in which ethylene methacrylate copolymer is either partially or completely neutralized with an organic polymer. Polyalkoxylated ammonium salts as disclosed in this invention were not described Moreover, the foregoing references produce materials comprising very large tactoids and little if any dispersion of individual platelet particles.

DESCRIPTION OF THE INVENTION

The present invention relates to processes to prepare polymer-platelet composite compositions and to certain polymer/platelet particle compositions wherein said platelet particles are treated with polyalkoxylated ammonium salts containing polyalkoxylated groups consisting of greater turn 5 repeating alkyl oxide groups. The polymer/platelet composites of this invention exhibit an unexpectedly higher elongation-at-break and gas barrier properties than other layered clay polyester composites. It has also been found that a greater amount of this polyalkoxylated ammonium clay relative to other orgzaoclays can be used in a polymer matrix and still achieve exceptable platelet particle separation. The process of this invention may be used to prepare a wide variety of polymer-platelet particle compositions.

More specifically this invention relates to a polyester composite material which is comprised of a melt processible polyester and up to about 25 weight percent of a swellable layered clay material which is intercalated with a polyalkoxylated ammonium salt having poly(oxyalkylene[n]) groups in which the alkylene unit comprises 2 to 6 carbon atoms and the average number of repeating oxyalkylene units (n) is at least 2 and up to about 200. The resulting platelet particles are dispersed in the polymer.

DESCRIPTION OF THE DRAWING

Another aspect of this invention is the significant reduction of oxygen permeability that is possible in a polyester when the when the layered clay having polyalkoxylated ammonium groups as described in this invention are dispersed in the polyester. The oxygen permeability measurements of 10-mil thick compression molded films shown in Table 3 and in FIG. 1 illustrate this point. The polyesters of Examples 32–35 containing the polyalkoxylated ammonium treated clays from Example 12 have significantly reduced permeability (improved barrier) compared to other polyester-platelet composites at similar clay loadings as determined by percent ash.

The process for manufacturing the polyester composite material of this invention comprises (1) preparing the intercalated layered clay material and (2) incorporating the intercalated layered clay material in a polyester. Incorporation may be by polymerization of monomers to the polyester in the presence of the intercalated layered clay material followed by solid-state processing if necessary to obtain the desired molecular weight or by melt processing the polyester with the intercalated layered clay material.

Figure 1:
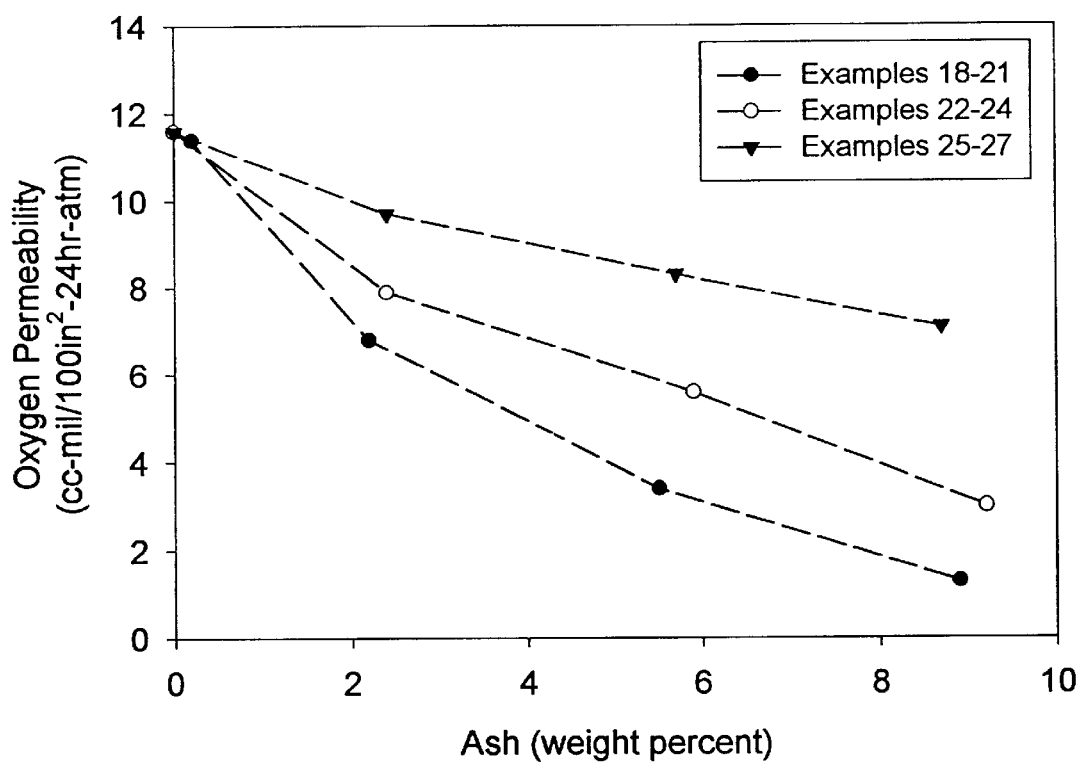

The first step of this invention is the preparation of the intercalated layered clay material by the reaction of a swellable layered clay with a polyalkoxylated ammonium compound. Generally, swellable layered clay materials are free flowing powders having a cation exchange capacity between about 0.3 and about 3.0 milliequivalents per gram of mineral. The clay may have a wide variety of exchangeable cations present in the galleries between the layers of the clay, including, but not limited to cations comprising the alkaline metals (group IA), the alkaline earth metals (group IIA), and their mixtures. The most preferred cation is sodium; however, any cation or combination of cations may be used provided that most of the cations are exchanged for onium ions during the process of this invention. Preferably, the individual layers of the platelet particles should have a thickness of less than about 2 nm and a diameter in the range of about 10 to about 1000 nm. Useful swellable layered clay materials include natural, synthetic, and modified phyllosilicates. Illustrative of such clays are sniectite clays, such as montmorillonite, saponite, hectorite, mica, vermiculite, bentonites, nontronite, beidellite, volkonskoite, saponite, sauconite, magadiite, kenyaite and the like, synthetic clays, such as synthetic mica, synthetic saponite, and synthetic hectorite, and modified clays, such as fluoronated montmorillonite. Other platelet or layered type materials, such as chalcogens may also be used. Suitable clays are available from various companies including Southern Clay Products and Nanocor, Inc. Generally the clays are an agglomeration of platelet particles which are closely stacked together like cards, called tactoids.

Preferred swellable layered clay materials are phyllosilicates of the 2:1 type having a cation exchange capacity of 0.5 to 2.0 meq/g. The most preferred swellable layered clay materials are sniectite clay mineral., specifically bentonite or montmorillonite, more specifically sodium bentonite or sodium montmorillonite.

Numerous methods to modify layered particles with organic cations are known, and any of these may be used in the process of this invention.

One embodiment of this invention is the modification of a layered particle with an organic cation by the process of dispersing a layered particle material in hot water, most preferably from 50 to 80° C., adding an organic cation salt or combinations of organic cation salts (neat or dissolved in water or alcohol) with agitation, then blending for a period of time sufficient for the organic cations to exchange most of the metal cations present in the galleries between the layers of the clay material. Then, the organically modified layered particle material is isolated by methods known in the art including, but not limited to, filtration, centrifugation, spray drying, and their combinations. It is desirable to use a sufficient amount of the organic cation salt to permit exchange of most of the metal cations in the galleries of the layered particle for organic cations; therefore, at least about 1 equivalent of organic cation salt is used and up to about 3 equivalents of organic cation salt can be used. It is preferred that about 1.1 to 2 equivalents of organic cation salt be used, more preferable about 1.1 to 1.5 equivalents. It is desirable, but not required, to remove most of the metal cation salt and most of the excess organic cation salt by washing and other techniques known in the art. The particle size of the resulting organoclay is reduced in size by methods known in the art, including, but not limited to, grinding, pulverizing, hammer milling, jet milling, and their combinations. It is preferred that the average particle size be reduced to less than 100 micron in diameter, more preferably less than 50 micron in diameter, and most preferably less than 20 micron in diameter. The process to prepare the organoclay may be conducted in a batch, semi-batch, or continuous manner.

Useful organic cation salts for the process of this invention can be represented by Formula I:

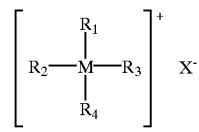

Wherein M represents either nitrogen or phosphorous; $X^-$ represents an anion selected from the group consisting of halogen, hydroxide, or acetate anions, preferably chloride and bromide; $R_1$, $R_2$, $R_3$, and $R_4$ are independently selected from organic and oligomeric ligands or may be hydrogen. Examples of useful organic ligands include, but are not limited to, linear or branched alkyl groups having 1 to 22 carbon atoms, aralkyl groups which are benzyl and substituted benzyl moieties including fused ring moieties having linear chains or branches of 1 to 22 carbon atoms in the alkyl portion of the structure, aryl groups such as phenyl and substituted phenyl including fused ring aromatic substituents, beta, gamma unsaturated groups having six or less carbon atoms, and alkyleneoxide groups having 2 to 6 carbon atoms. Examples of useful oligomeric ligands include, but are not limited to, poly(alkylene oxide), polystyrene, polyacrylate, polycaprolactone, and the like.

Examples of useful organic cations include, but are not limited to, alkyl ammonium ions, such as dodecyl ammonium, octadecyl ammonium, bis(2-hydroxyethyl) octadecyl methyl ammonium, octadecyl benzyl dimethyl ammonium, tetramethyl ammonium, and the like or mixtures thereof, and alkyl phosphonium ions such as tetrabutyl phosphonium, trioctyl octadecyl phosphonium, tetraoctyl phosphonium, octadecyl triphenyl phosphonium, and the like or mixtures thereof. Illustrative examples of suitable poilyalkoxylated ammonium compounds include those available under the trade name Ethoquad or Ethomeen from Akzo Chemie America, namely, Ethoquad 18/25 which is octadecyl methyl bis(polyoxyethylene[15])ammonium chloride and Ethomeen 18/25 which is octadecyl bis (polyoxyethylene[15])amine, wherein the numbers in brackets refer to the total number of ethylene oxide units. The most preferred organic cation is octadecyl methyl bis (polyoxyethylene[15]) ammonium chloride.

The most preferred poly(alkoxylated)ammonium compounds can be represented by Formula I wherein M is nitrogen, $R_3$ and $R_4$ are independently selected from the group consisting of H or substituted or unsubstituted hydroxy terminated polyoxyalkalenes wherein the alkyl part comprises 2 to 6 carbon atoms and the number of repeat oxyalkalene units in each R group is between 2 and 100;

$R_1$ and $R_2$ are independently selected from the group consisting of (a) hydrogen; (b) linear or branched alkyl groups having 1 to 22 carbon atoms; (c) aralkyl groups which are benzyl and substituted benzyl moieties including fused ring moieties having linear chains or branches of 1 to 22 carbon atoms in the alkyl portion of the structure; (d) aryl groups such as phenyl and substituted phenyl including fused ring aromatic substituents; and (e) beta, gamma unsaturated groups having six or less carbon atoms or hydroxyalkyl groups having 2 to 6 carbon atoms; and $X^-$ represents an anion selected from the group consisting of halogen, hydroxide, or acetate anions, preferably chloride and bromide.

The substituents on the polyoxyalkalenes of $R_3$ and $R_4$ are selected from the group consisting of linear or branched alkyl groups having up to 5 carbon atoms.

Illustrative examples of suitable poly(alkoxylated ammonium compounds include those available under the tradename Ethoquad or Ethomeen from Akzo Chemie America, namely, Ethoquad 18/25 which is octadecyl methyl bis (polyoxyethylene[15]) ammonium chloride and Ethomeen 18/25 which is octadecyl bis(polyoxyethylene[15])amine, wherein the numbers in brackets refer to the total number of ethylene oxide units.

The intercalated layered clay materials (or platelet particles) of this invention may be prepared by dispersing the clay in a solvent such as water, above room temperature, most preferably from 50 to 80° C. The poly(alkoxylated) ammonium salt is then added under agitation and blended for a period of time sufficient for the ammonium compound to exchange most Of the cations, usually sodium ions, associated with the layers of the clay. The cation exchanged clay at this stage is generally referred to as an organoclay or intercalated clay.

Other suitable solvents include neat or mixed solvents selected from water, methanol, ethanol, propanol, isopropanol, ethylene glycol, dioxane and mixtures thereof.

The second step of this invention is to incorporate the intercalated clay material into a melt-processible polyester. Preferably, the platelet particles are dispersed in the polyester so that most of the platelet particles exist as individual platelets, small tactoids, and small aggregates. Preferably, a majority of the tactoids and aggregates in the polyester/ platelet compositions of the present invention will have thickness in its smallest dimension of less than about 20 nm. Polyester-platelet compositions with the higher concentration of individual platelets and fewer tactoids or aggreagates are preferred.

Dispersions of this fine quality of any platelet particle in any polyester have not been previously disclosed. Previous patents and applications have claimed to produce polyesters containing intercalated or exfoliated platelet particles (no tactoids, only widely separated particles), however, the results could not be reproduced. The polyester/platelet compositions of the prior art are believed to be dispersions of agglomerates which are larger than tactoids. While the agglomerates were well spaced, very few platelets and tactoids could be found. Without achieving a good dispersion (tactoids and platelets spaced at least 2 nm apart) improved barrier and visual properties cannot be achieved.

The compositions of the present invention comprise between about 0.01 and about 25 wt %, preferably between 0.5 and 25 wt %, more preferably between 0.5 and 15 wt % and most preferably between 0.5 and 10 wt % said platelet particles. The amount of platelet particles is determined by measuring; the amount of silicate residue in the ash of the polyester/platelet compositions when treated in accordance with ASTM D5630-94.

One method of incorporation is the polycondensaticn of monomers to the polyester in the presence of the intercalated clay material. The polyester in the present invention may be produced using well known polycondensation procedures.

Typically, melt processible polyesters, such as PET, are prepared by a 2-step process. In the first step, glycol monomers, such as ethylene glycol, are either esterified with an acid monomer, such as terephthalic acid or transesterified with a dimethyl ester monomer, such as dimethyl terephthalic acid, at temperatures in the range of 170 to 240° C. It has been found that many layered particles, especially those modified with organic cations, reduce the rate of transesterification reaction in the first step. Therefore, it is preferred that when organoclay particles are used that they be added after the transesterification or esterification step is complete. Alternatively, the transesterification or esterification product can be isolated and used as the initial monomers for reaction in the presence of layered particles. In the second step, melt polycondensation is conducted at reduced pressure, typically less than 10 torr, and at temperatures sufficient to keep the polymer molten, typically 240 to 320° C. Melt polymerization is typically conducted at less than 10 torr; however, because short reaction times are preferred and low I.V.s are typically obtained, the use of vacuum to less than 10 torr is not required. The melt polycondensation may be conducted using dynamic inert gas atmosphere or vacuum. Inert gas is any gas that does not react or cause the absorption of water into the polyester pellets at the temperature and conditions which are present. Suitable gases include, but are not limited to partially or fully dehumidified air, argon and nitrogen.

Ether formation is a common side reaction of melt phase polymerizations of polyesters, resulting in the formation of diethylene glycol units during PET polymerization, for example. Ether formation is generally undesirable because the ether units, such as diethylene glycol, typically reduce the melting point and glass transition temperature and typically increase the planar stretch ratio of polyesters. Even for the polymer composites of this invention for which ether units are desired, for example to control planar stretch ratio or crystallization rates, it is preferred that the amount of ether units be controlled by monomer feed rather than by a side reaction in order to provide better control of the composition and a wider range of compositions.

It has been found that organoclay particles catalyze ether formation. For example PET-platelet composites prepared from organoclay particles have diethylene glycol content that is higher than is observed when no organocation modified layered particle is used in the preparation of the neat PET. The formation of either units depends on many factors including the combination of choice of clay and choice of onium tether for the organocation modified layered particle. Some organoclays give so much ether formation that the polyester composite resulting from the melt phase polymerization may be incapable of crystallizing sufficiently to permit solid state polymerization. A slurry of a dry powder reagent is often prepared for ease of addition to a reactor, and often the reagent glycol or an alcohol are used. It is preferred that the amount of alcohol or glycol, such as ethylene glycol, used to slurry the organoclay particles for the purpose of aiding addition to a reactor be minimized in order to minimize the amount of ether units formed. Thus, addition of dry organoclay particles is most preferred. It is also preferred that the melt polymerization time be minimized in order to minimize the amount of ether units formed.

Suitable polyesters include at least one dibasic acid in at least one glycol. The primary dibasic acids are terephthalic, isophthalic, naphthalenedicarboxylic, 1,4-cyclohexanedicarboxylic acid and the like. The various isomers of naphthalenedicarboxylic acid or mixtures of isomers may be used, but the 1,4-, 1,5-, 2,6-, and 2,7-isomers are preferred. The 1,4-cyclohexanedicarboxylic acid may be in the form of cis, trans, or cis/trans mixtures. In addition to the acid forms, the lower alkyl esters or acid chlorides may be also be used.

The dicarboxylic acid component of the polyester may optionally be modified with up to about 50 mole percent of one or more different dicarboxylic acids. Such additional dicarboxylic acids include dicarboxylic acids having from 6 to about 40 carbon atoms, and more preferably dicarboxylic acids selected from aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of suitable dicarboxylic acids include terephthalic acid, phthalic acid, isophthalic acid, naphthalene-2,6-dicarboxylic acid, cyclohexanedicarboxitlic acid, cyclohexanediacetic acid, diphenyl-4,4'-dicarboxylic acid, succinic acid, glutaric acid, adipic acid, azelaic acid, sebacic acid, diglycolic acid, 1,3-phenylenedioxy diacetic acid and the like. Polyesters may be prepared from one or more of the above dicarboxylic acids.

Typical glycols used in the polyester include aliphatic glycols containing from two to about ten carbon atoms, aromatic glycols containing from about 6 to about 15 carbon atoms and cycloaliphatic glycols containing from about 7 to about 14 carbon atoms. Preferred glycols include ethylene glycol, 1,4-butanediol, 1,6-hexanediol, 1,4-cyclohexanedimethanol, diethylene glycol and the like. Preferred glycols for fully aromatic polyesters include hydroquinone and resourcinol. The glycol component may optionally be modified with up to about 50 mole percent of one or more different diols. Such additional diols include cycloaliphatic diols preferably having 6 to 20 carbon atoms or aliphatic diols preferably having 3 to 20 carbon atoms. Examples of such diols include: diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(2-hydroxyethoxy)-benzene, 1,3-di-(2-hydroxyethoxy) benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane and the like. 1,4-Cyclohexanedimethanol may be used as the cis, trans or cis/trans mixtures. Polyesters may be prepared from one or more of the above diols.

Difunctional compounds, like hydroxybenzoic acid may also be used.

Also small amounts of multifunctional polyols such as trimethylolpropane, pentaerythritol, glycerol and the like may be used if desired.

The resin may also contain small amounts of trifurictional or tetrafunctional comonomers to provide controlled branching in the polymers. Such comonomers include trimellitic anhydride, trimethylolpropane, pyromellitic dianhydride, pentaerythritol, trimellitic acid, pyromellitic acid and other polyester forming polyacids or polyols generally known in the art.

The polyesters of the present invention may also include additives normally used in polyesters. Such additives include, but are not limited to colorants, pigments, carbon black, glass fibers, fillers, impact modifiers, antioxidants, stabilizers, flame retardants, reheat aids, acetaldehyde reducing compounds and the like.

The amount of intercalated layered clay incorporated into the polyester may vary widely depending on the intended use of the composite. The amount of material employed is preferably from about 2 to 20% by weight of the mixture.

The polyester containing the homogeneously distributed layered clay can be formed into film by suitable film-forming methods, such as extrusion or pressing, or when the appropriate polyester is used, may be blown into bottles.

All inherent viscosities (IV) are determined at 25° C. using 0.5 g of polymer per 100 mL of a solvent consisting of 60 parts by weight phenol and 40 parts by weight tetrachloroethane. The melting temperatures and glass transition temperatures are determined by differential scanning calorimetry (DSC) on the second heating cycle at a scanning rate of 20° C. per minute after the sample has been heated to melting and quenched to below the glass transition temperature of the polymer. Oxygen permeability measurements were obtained according to ASTM D-3985 using a MOCON Oxtran-1000 instrument at 30° C. and 68% relative humidity with a pure oxygen permeant and a nitrogen gas carrier.

EXAMPLES

The polyester composite materials of this invention are further illustrated by the following examples.

Example 1

This example illustrates the method for preparing the intercalated clay materials used in this invention. Sodium montmorillonite (10 grams, 9.5 milliequivalents, clay supplied by Southern Clay Products and reported to have a cation exchange capacity of 95 milliequivalents/100 grams) was mixed with 490 ml of water at 60° C. in a Vitamix blender to form a 2% by weight slurry of clay in water. Octadecyl methyl bis(polyoxyethylene[15])ammonium chloride (13.9 grams, 14.25 milliequivalents, 10 mole percent excess) commercially available as Ethoquad 18/25 was added to the Vitamix blender and tile mixture blended at high speed for one minute. The solids formed were removed by filtration on a Buchner funnel. The product was reslurried in 250 ml of water in a Vitamix blender, filtered again, and dried in an air circulating oven at 60° C. for 16 hours. The product exhibited a basal spacing by X-ray diffraction of 3.40 nanometers.

Example 2

The procedure of Example 1 is repeated, except that the organic salt used is octadecyl bis(polyoxyethylene[5])amine (Ethomeen 18/15) which was converted to the ammonium salt by reacting the amine with an equivalent of dilute aqueous hydrochloric acid. The product exhibited a basal spacing by X-ray diffraction of 1.75 nanometers.

Example 3

The procedure of Example 1 is repeated, except that the organic salt used is ctadecyl bis(polyoxyethylene[15])amine (Ethomeen 18/25) which was converted to the ammonium salt by reacting the amine with an equivalent of dilute aqueous hydrochloric acid. The product exhibited a basal spacing by X-ray diffraction of 1.80 nanometers.

Example 4

This example illustrates the method for preparing the polyethylene terephthalate containing the intercalated clay materials used in this invention. Polyethylene terephthalate containing 2 weight percent of octadecyl methyl bis (polyoxyethylene[15]) ammonium montmorillonite of Example 1 was prepared by charging 63.5 g of bis(2-hydroxyethyl) terephthalate and 0.99 g of organoclay from Example 1 into a single-neck, 1-L round-bottom flask. The appropriate amounts of metal catalyst solutions was added to provide 230 ppm of antimony in the final composite. The flask was fitted with a stainless steel stirring rod and a polymer head, consisting of a short distillation column and nitrogen inlet. The flask was purged with nitrogen by alternating vacuum to 100 torr and nitrogen. The flask was given a dynamic nitrogen atmosphere by passing nitrogen through the nitrogen inlet at a rate of about 0.3 scfh (standard cubic feet per hour). A metal bath, which was preheated to 280° C., is raised until it covers the flask. After the solid monomer melts, stirring at 450 rpm (rotations per minute) was begun. Vacuum of less than 0.3 torr was applied to the melt gradually over a period of 15 minutes to prevent foaming. Vacuum of less than 0.3 torr and temperature of 280° C. was maintained for 60 minutes, during which time ethylene glycol condensate collects in a receiving flask and the viscosity of the melt increases. The stirring rate was decreased as the melt viscosity increases to prevent the viscous melt from wrapping around the stirrer shaft and pulling away from the flask wall. Then, the metal bath was lowered, the vacuum was released with nitrogen, stirring is stopped, and the nanocomposite cools to a semicrystalline solid. The nanocomposite was released from the glass flask by melting the outer edges of the polymer by immersing the flask into the metal bath, which was preheated to 290° C., and applying enough torque on the stirring rod to allow the nanocomposite to release from the flask wall. After cooling to room temperature, the flask was broken, and the nanocomposite was then broken from the stirrer using a hydraulic cutter. The nanocomposite pieces were ground to pass a 6 mm mesh screen to give about 160 g of material. The final polymer had an inherent viscosity of 0.71 dL/g and melting point by DSC of 202° C. X-ray diffraction shows no basal spacing below 4.5 nm, indicating extensive exfoliation of the clay.

Example 5

The procedure of Example 4 was repeated, except that the intercalated clay material used was octadecyl bis (polyoxyethylene[5]) ammonium montmorillonite of Example 2. The final polymer had an inherent viscosity of 0.67 dL/g and melting point by DSC of 246° C. X-ray diffraction shows no basal spacing below 4.5 nm, indicating essentially complete exfoliation of the clay.

Example 6

The procedure of Example 4 was repeated, except that the intercalated clay material used was octadecyl bis (polyoxyethylene[15]) ammonium montmorillonite of Example 3. The final polymer had an inherent viscosity of 0.76 dL/g and melting point by DSC of 239° C.

Example 7

The procedure of Example 1 was repeated, except that the organic salt used was octadecyl bis(polyoxyethylene[2]) amine (Ethomeen 18/12) which was converted to the ammonium salt by reacting the amine with an equivalent of dilute aqueous hydrochloric acid. The product exhibited a basal spacing by X-ray diffraction of 1.73 nanometers.

Example 8

The procedure of Example 4 is repeated, except that the intercalated clay material used is octadecyl bis (polyoxyethylene[2]) ammonium montmorillonite of Example 7. The final polymer has an inherent viscosity of 0.84 dL/g and a melting point by DSC of 252° C.

Example 9

The procedure of Example 4 was repeated, except that the organoclay used is Claytone EM obtained from Southern Clay Products. The final polymer had an inherent viscosity of 0.80 dL/g and melting point by DSC of 246° C.

Example 10

The procedure of Example 4 is repeated, except that the organoclay uses is Claytone APA obtained from Southern Clay Products. The final polymer has an inherent viscosity of 0.61 dL/g and melting point by DSC of 74° C.

Example 11

Films were formed from the polyester composite materials by extrusion through a die using a Killion 1-in. single-screw extruder at 285° C. Oxygen permeability measurements were obtained according to ASTM D-3985 using a MOCON Oxtran-1000 instrument at 30° C. and 68% relative humidity with a pure oxygen permeant and a nitrogen gas carrier. Elongation-at-break and yield stress of the films were obtained according to ASTM D882. The results are set forth in Table 1. Table 1 shows that the elongation-at-break of the polyester composites containing polyalkoxylated ammonium montmorillonite with greater than five alkyl oxide repeat units is superior to other polyester composites. The oxygen permeability of these polyester composites is also superior to the polyester alone.

TABLE 1

Extruded Film Characterization of PET Containing 2 Weight % Clay

| Example | Clay | I.V. (of film) | Elongation-at-Break (%) | Oxygen Permeability (cc-mil/100 in$^2$-24 hr-atm) |
| --- | --- | --- | --- | --- |
| Polyethylene Terephthalate | None | 0.66 | 610 | 10.0 |
| Example 4 | Example 1 | 0.73 | 580 | 9.0 |
| Example 5 | Example 2 | 0.66 | 94 | 7.8 |
| Example 6 | Example 3 | 0.70 | 69 | 8.7 |
| Example 8 | Example 7 | 0.72 | 4 | 11.0 |
| Example 9 | Claytone EM | 0.63 | 4 | 9.1 |
| Example 10 | Claytone APA | 0.59 | 4.6 | 9.5 |

[1]Oxygen permeability units are cc-mil/100 in$^2$-24 hrs-atm

The polyalkoxylated ammonium montmorillonite clays maintained good elongation-at-break of polyester. The elongation-at-break of extruded film of (1) polyethylene terephthalate containing 2 wt % of octadecyl methyl bis (polyoxyethylene[15]) ammonium montmorillonite (Example 4) and (2) polyethylene terephthalate containing 2 wt % of octadecyl bis(polyoxyethylene[2]) ammonium montmorillonite (Example 8) are 580 and 4%, respectively. This shows the superior properties of polyethylene terephthalate containing layered clay having polyalkoxylated ammonium groups prepared with 15 ethylene oxide units compared to polyethylene terephthalate containing layered clay having polyalkoxylated ammonium groups having only 2 ethylene oxide groups. The gas permeability of film from this novel polyester composite and a polyethylene terephthalate control is 9.0 and 10.0 cc-ml/100 in$^2$/24 hours, respectively. This shows that the novel polyester composite also has better gas barrier properties than the pure polyester alone.

Example 12

The following example illustrates the preparatior of an organocation modified layered particle. 72.0 grams (68.4 meq) of sodium montmorillonite (clay supplied by Southern Clay Products and reported to have a cation exchange capacity of 95 milliequivalents/100 grams) and 3600 ml of water at 60° C. were blended in a Henschel mixer for two minutes at about 1500 rpm. 73.7 g (75.2 meq) of octadecylmethyl-[ethoxylated(15)] ammonium chloride (commercially available as Ethoquad 18/25) in 360 ml of water were added to the mixer and blended for two minutes. The solids were then removed by filtration with a Buchner funnel with fritted disk. The wet solids were then slurried in 400 ml of water in a Vitamix Blender and filtered. The filtercake was dried at 60° C. in an oven for 16 hours to provide 59 grams of a light tan solid. Analysis by X-ray diffraction showed a basal spacing of 3.28 nm. Ash residue, which is a measure of the inorganic content, was 51 weight percent. The material was passed through a hammer mill then a jet mill to reduce the number average particle size to about 10 microns.

Example 13

A bis(2-hydroxyethyl)methyl tallow ammonium chloride (Ethoquad T/12) treated sodium montmorillonite, as disclosed in WO 96/08526, was obtained from Southern Clay Products.

Example 14

The procedure of Example 12 was repeated, except that the organic salt used was 12-aminododecanoic acid which was converted to the organic salt by addition of hydrochloric acid. The product exhibits a basal spacing by X-ray diffraction of 1.66 nm and an ash residue of 78 weight percent.

Example 15

The procedure of Example 12 was repeated, except that the clay used was Kanunpia-F, which is a commercial sodium montmorillonite from Kunimine Ind. Co. and is reported to have a cation exchange capacity of 119 milliequivalents per 100 grams. The product exhibited a basal spacing by X-ray diffraction of 3.23 nm and an ash residue of 49 weight percent.

Example 16

The following example illustrates the melt phase preparation of a polyester composite by adding organocation modified layered particle powder to a PET oligomer that was prepared by esterification of terephthalic; acid and ethylene glycol. 115 g of oligo(ethylene terephthalate) (number average molecular weight of 377 g/mole), 3.96 g of 1,4-cyclohexane dimethanol, and 2.67 g of organocation modified layered particle from Example 12 were charged to a single-neck, 1-L round-bottom flask. The appropriate amounts of metal calalyst solutions were added to provide 20 ppm titanium, 40 ppm phosphorus, 80 ppm cobalt, and 230 ppm of antimony in the final composite. The flask was fitted with a stainless steel stirring rod and a polymer head, consisting of a short distillation column and nitrogen inlet. The flask was purged with nitrogen by alternating vacuum to 100 torr and nitrogen. The flask was given a dynamic nitrogen atmosphere by passing nitrogen through the nitrogen inlet at a rate of about 0.3 standard cubic feet per hour (scfh). A metal bath, which was preheated to 220° C., was raised until it covers the flask. After the solid monomers melt, stirring at 150 rotations per minute (rpm) was begun. The temperature was held at 220° C. for 15 minutes to allow the 1,4-cyclohexane dimethanol to react. The metal bath temperature was increased to 280° C. over a period of about 15 minutes. With stirring at 150 rpm at 280° C., vacuum of less than 0.3 torr was applied to the melt gradually over a period of 15 minutes to prevent foaming. Vacuum of less than 0.3 torr, temperature of 280° C., stirring at 150 rpm was maintained for 15 minutes, during which time ethylene glycol condensate collected in a receiving flask and the viscosity of the melt increased. Then, the metal bath is lowered, the vacuum was released with nitrogen, stirring was stopped, and the composite cooled to a semicrystalline solid. The composite was released from the glass flask by melting the outer edges of the polymer by immersing the flask into the metal bath, which was preheated to 290° C., and applying enough torque on the stirring rod to allow the composite to release from the flask wall. After cooling to room temperature, the flask was broken, and the composite was then broken from the stirrer using a hydraulic cutter. The composite pieces were ground to pass a 4 mm mesh screen to give about 160 g of material. Analytical analyses show the composite material has an IV value of 0.31 dL/g, low shear melt viscosity at 280° C. of $87.3 \times 10^3$ P, and the following glycol residues based on 100 mole percent total glycol residues: 11 mole percent diethylene glycol, 4 mole percent 1,4-cyclohexane dimethinol, and 85 mole percent ethylene glycol.

Example 17

The following example illustrates solid state polymerization of polyester/organocation modified layered particle composites. The fine particles were removed from the ground composite material from Example 16 using a 0.85 mm mesh screen. The composite material was dried overnight in a vacuum oven at 120° C. with a slight nitrogen purge. The dried material was placed into a glass solid state polymerization unit with a nitrogen purge of 14 scfh and heated by boiling diethyl succinate which had a boiling point of 218° C. After a period of 16 hours, heating was discontinued and the solid state polymerization unit is allowed to cool. After cooling, the composite material was removed. Analytical results show that the composite had an IV value of 0.70 dL/g, a low shear melt viscosity at 280° C. of $261 \times 10^3$ P, an ash residue of 5.6 weight percent, a glass transition temperature of 64° C., and a melting point of about 239° C.

The above composite material dried overnight in a vacuum oven at 120° C. with a slight nitrogen purge. The dried material was compression molded at 280° C. then quenched in ice-water to provide a clear film with thickness of about 10 mil. Testing conducted on the film show the oxygen permeability was 2.5 cc-mil/100in$^2$-24hr-atm, the Young's modulus was 2.3 GPa, and the tensile strength was 49 MPa. Thus, the polyester/organocation modified layered particle composite had significantly improved barrier and tensile properties.

Comparative Example 1

Examples 5 was followed except that no organocation modified layered particle was used. The polyester had an IV of 0.20 dL/g, a melt viscosity of less than 10 P, and glycol residue composition of 2 mole percent diethylene glycol, 4 mole percent 1,4-cyclohexane dimethanol, and 94 mole percent ethylene glycol.

Example 6 was followed using the above clay-free material. The polyester had an IV of 0.68 dL/g and a melt viscosity at 280° C. of $3.1 \times 10^3$ P.

Film prepared from the above clay-free material had an oxygen permeability value of__cc-mil/100in$^2$-24 hr atm, Young's modulus of__GPa, and tensile strength of__MPa.

Examples 18–31

These examples illustrate the use of a variety of organocation modified layered particles at varying weight percent loadings in the melt phase polymerization step. Example 16 was repeated except that the amount of organocation modified layered particle was adjusted to give the target weight percent of the selected organocation modified layered particle in the composite as indicated in Table 2.

TABLE 2

| Example | Organoclay | Wt % | Ash (wt %) | I.V. (dL/g) | Diethylene Glycol Content (mol %) | $T_g$ (° C.) | $T_m$ (° C.) |
|---|---|---|---|---|---|---|---|
| 18 | Example 12 | 0.5 | 0.2 | 0.24 | — | 74 | 233 |
| 19 | Example 12 | 4 | 2.2 | 0.48 | 4.5 | 76 | 239 |
| 20 | Example 12 | 10 | 5.5 | 0.34 | 6.2 | 70 | 241 |
| 21 | Example 12 | 16 | 8.9 | 0.26 | 12 | 58 | 241 |
| 22 | Example 13 | 3 | 2.4 | 0.45 | 11 | 71 | 225 |
| 23 | Example 13 | 8 | 5.9 | 0.40 | 9.9 | 72 | 229 |
| 24 | Example 13 | 13 | 9.2 | 0.32 | 11 | 68 | 223 |
| 25 | Example 14 | 4 | 2.4 | 0.46 | 5.6 | 76 | 238 |
| 26 | Example 14 | 10 | 5.7 | 0.44 | 7.9 | 74 | 240 |
| 27 | Example 14 | 16 | 8.7 | 0.39 | 10 | 72 | 244 |
| 28 | Example 15 | 10 | 5.8 | 0.35 | 8.3 | 68 | 237 |
| 29 | Claytone APA | 3 | 1.9 | 0.42 | 3.4 | 79 | 241 |
| 30 | Claytone APA | 8 | 5.4 | 0.40 | 4.8 | 76 | 239 |
| 31 | Claytone APA | 13 | 8.2 | 0.28 | 5.9 | 73 | 235 |

Examples 32–45

These examples illustrate the use of a variety of precursor materials containing a variety of organocation modified layered particles at varying weight percent coatings in the solid state polymerization step. Example 17 was followed except that the solid state polymerization time was adjusted as indicated in Table 3.

TABLE 3

| Example | Precursor | Organoclay | Solid State Polym. Time (hr) | I.V. (dL/g) | Oxygen Permeability (cc-mil/100 in²-day-atm) |
|---|---|---|---|---|---|
| 32 | Example 18 | Example 12 | 24 | 0.85 | 11.4 |
| 33 | Example 19 | Example 12 | 4 | 0.71 | 6.8 |
| 34 | Example 20 | Example 12 | 16 | 0.68 | 3.4 |
| 35 | Example 21 | Example 12 | 24 | 0.51 | 1.3 |
| 36 | Example 22 | Example 13 | 8 | 0.73 | 7.9 |
| 37 | Example 23 | Example 13 | 8 | 0.67 | 5.6 |
| 38 | Example 24 | Example 13 | 8 | 0.59 | 3.0 |
| 39 | Example 25 | Example 14 | 4 | 0.86 | 9.7 |
| 40 | Example 26 | Example 14 | 8 | 1.03 | 8.3 |
| 41 | Example 27 | Example 14 | 23 | 0.99 | 7.1 |
| 42 | Example 28 | Example 15 | 23 | 0.69 | 3.7 |
| 43 | Example 29 | Claytone APA | 8 | 0.74 | 10.1 |
| 44 | Example 30 | Claytone APA | 8 | 0.59 | 8.2 |
| 45 | Example 31 | Claytone APA | 8 | 0.50 | 7.8 |

Examples 46–50

These examples illustrate the effect of time at 280° C. during melt phase polymerization on ether formation as indicated by diethylene glycol residue content in the product. Example 16 was repeated except that the time at 280° C. during melt polycondensation was adjusted from 0 to 45 minutes as indicated in Table 4. Zero time at 280° C. means that vacuum was not applied; otherwise, vacuum was applied over a period of 15 minutes as described in Example 16. The results show that ether formation catalyzed by the organocation modified layered particle occurs during melt phase polymerization at 280° C.

TABLE 4

| Example | Time at 280° C. (min) | I.V. (dL/g) | Diethylene Glycol Content (mol %) |
|---|---|---|---|
| 46 | 0 | 0.12 | 3.4 |
| 47 | 20 | 0.27 | 7.5 |
| 48 | 25 | 0.30 | 9.4 |
| 49 | 30 | 0.27 | 8.9 |
| 50 | 45 | 0.30 | 12.1 |

Example 51

The following example illustrates the melt phase preparation of a polyester/organocation modified layered particle composite by adding the organocation modified layered particle up front with dimethyl terephthalate and ethylene glycol. 194 g (1.00 mole) of dimethyl terephthalate, 124 g (2.00 moles) of ethylene glycol, and 3.99 g of organocation modified layered particle from Example 1 are charged to a single-neck, 1-L round-bottom flask. The appropriate amounts of metal catalyst solutions are added to provide 20 ppm titanium, 55 ppm manganese, 80 ppm cobalt, and 230 ppm of antimony in the final composite. The flask was fitted with a stainless steel stirring rod and a polymer head, consisting of a short distillation column and nitrogen inlet. The flask was purged with nitrogen by alternating vacuum to 100 torr and nitrogen. The flask was given a dynamic nitrogen atmosphere by passing nitrogen through the nitrogen inlet at a rate of about 0.3 scfh (standard cubic feet per hour). A metal bath, which was preheated to 200° C., was raised until it covers the flask. The temperature of the metal bath decreases to about 1 80° C. upon immersion of the flask and reheats to 200° C. in about 10 minutes. During this time, the solid monomers melt, and stirring at 400 rpm (rotations per minute) was begun. The temperature was increased to 220° C. over a period of 5 hours, and methanol condensate collects in a receiving flask. The metal bath temperature was increased to 280° C. over a period of about 20 minutes. The appropriate amount of phosphorus containing solution was added to provide 110 ppm of phosphorus in the final composite. With stirring at 400 rpm at 280° C., vacuum of less than 0.3 torr was applied to the melt gradually over a period of 15 minutes to prevent foaming. Vacuum of less than 0.3 torr and temperature of 280° C. was maintained for 40 minutes, during which time ethylene glycol condensate collects in a receiving flask and the viscosity of the melt increases. The stirring rate was decreased as the melt viscosity increases to prevent the viscous melt from wrapping around the stirrer shaft and pulling away from the flask wall. Then, the metal bath was lowered, the vacuum was released with nitrogen, stirring was stopped, and the composite cools to a semicrystalline solid. The composite was released from the glass flask by melting the outer edges of the polymer by immersing the flask into the metal bath, which was preheated to 290° C., and applying enough torque on the stirring rod to allow the composite to release from the flask wall. After cooling to room temperature, the flask was broken, and the composite was then broken from the stirrer using a hydraulic cutter. The composite pieces were ground to pass a 6 mm mesh screen to give about 160 g of material. Analytical results show the polyester/organocation modified layered particle product had I.V. of 0.50 dL/g, ash residue of 1.1 weight percent, glass transition temperature of 76° C., peak melting point of 248° C., low shear melt viscosity at 280° C. of $4.1 \times 10^3$ P, and glycol residue composition of 5 mole percent diethylene glycol and 95 mole percent ethylene glycol.

Example 52

The ground composite material from Example 51 was dried overnight in a vacuum oven at 110° C. with a slight nitrogen purge. The dried material was placed into a glass solid state polymerization unit with a nitrogen purge of 14 scfh and heated by boiling diethyl succinate which had a boiling point of 218° C. After a period of 8 hours, heating was discontinued and the solid state polymerization unit was allowed to cool. After cooling, the composite material was removed. Analytical results show that the IV increased to 0.99 dL/g and the low shear melt viscosity at 280° C. increased to $49 \times 10^3$ P.

The above composite material was dried overnight in a vacuum oven at 110° C. with a slight nitrogen purge. The dried material was compression molded at 280° C. then quenched in ice-water to provide a clear film with thickness of about 10 mil. The oxygen permeability of this film was determined to be 7.2 cc-mil/100in$^2$-24hr-atm.

Comparative Example 3

Example 51 was repeated except that no organocation modified layered particle was used. The polyester had an IV of 0.50 dL/g, and glycol residue composition of 2 mole percent diethylene glycol, 4 mole percent 1,4-cyclohexane dimethanol, and 94 mole percent ethylene glycol.

Example 52 was repeated using the above clay-free material. The polyester had an IV of 0.72 dL/g and a low shear melt viscosity at 280° C. of $5 \times 10^3$ P.

Film prepared from the above clay-free material had an oxygen permeability value of 11.6 cc-mil/100in$^2$-24 hr atm, Young's modulus of 1.8 GPa, and tensile strength of 49 MPa.

Examples 53–57

These examples illustrate the effect of time at 280° C. during melt phase polymerization on ether formation as indicated by diethylene glycol residue content in the product. Example 51 was repeated except that the amount of organocation modified layered particle from Example 1 was increased to provide about 10 weight percent organocation modified layered particle and the time at 280° C. during melt polycondensation was adjusted from 0 to 45 minutes as indicated in Table 5. Zero time at 280° C. means that vacuum was not applied; otherwise, vacuum was applied over a period of 15 minutes as described in Example 40. The results show that ether formation occurs during melt phase polymerization at 280° C.

TABLE 5

| Example | Time at 280° C. (min) | I.V. (dL/g) | Diethylene Glycol Content (mol %) |
| --- | --- | --- | --- |
| 51 | 0 | 0.16 | 3.5 |
| 52 | 20 | 0.20 | 8.1 |
| 53 | 25 | 0.26 | 10.4 |
| 54 | 30 | 0.33 | 10.4 |
| 55 | 45 | 0.33 | 10.8 |

Examples 58–60

These examples illustrate the effect of organocation modified layered particle on the rate of transesterification as indicated by the removal of the methanol condensate. The melt phase polycondensation of Example 51 was followed except that the time at 220° C. was extended to permit collection of the theoretical amount of methanol condensate for each of the organocation modified layered particles used as indicated in Table 6. The data in Table 6 shows that although essentially complete transesterification was achieved, as little as 2 weight percent of 3 different organocation modified layered particles significantly reduces the rate of condensate collected, especially early in the transesterification.

TABLE 6

| Example Organoclay Time (hr) | Comparative Example 2 None Condensate (% of total) | Example 58 Example 1 Condensate (% of total) | Example 59 Example 2 Condensate (% of total) | Example 60 Example 3 Condensate (% of total) |
| --- | --- | --- | --- | --- |
| 0.0 | 0 | 0 | 0 | 0 |
| 0.5 | 46 | 8 | 21 | 3 |
| 1.0 | 77 | 24 | 38 | 10 |
| 1.5 | 88 | 53 | 49 | 29 |
| 2.0 | 92 | 70 | 62 | 45 |
| 2.5 | 94 | 80 | 73 | 54 |
| 3.0 | 95 | 87 | 83 | 61 |
| 3.5 | 98 | 94 | 90 | 83 |

TABLE 6-continued

| Example Organoclay Time (hr) | Comparative Example 2 None Condensate (% of total) | Example 58 Example 1 Condensate (% of total) | Example 59 Example 2 Condensate (% of total) | Example 60 Example 3 Condensate (% of total) |
|---|---|---|---|---|
| 4.0 | 97 | 97 | 95 | 94 |
| 4.5 | 100 | 99 | 98 | 100 |
| 5.0 | 100 | 100 | 100 | 100 |

Example 61

The procedure of Example 23 was followed except that the amount of 1,4-cyclohexane dimethanol was increased to provide about 8 mole percent in the final composite. The precursor composite was readily crystallized and had I.V. of 0.38 dL/g, ash residue of 5.6 weight percent, diethylene glycol content of 9 mole percent, and low shear melt viscosity at 280° C. of 77×10$^3$ P. Then the solid state polymerization procedure of Example 6 was followed using the above precursor material, and after solid state polymerization for 8 hours, the composite had I.V. of 0.69 dL/g and low shear melt viscosity at 280° C. of 220×10$^3$ P. Film prepared from this composite had oxygen permeability of 5.9 cc-mil/100in2-day-atm, Young's modulus of 2.5 GPa, and tensile strength of 42 MPa.

Example 62

The procedure of Example 61 was followed except that the amount of 1,4-cyclohexane dimethanol was increased to provide 12 mole percent in the final composite. The precursor composite was readily crystallized and had I.V. of 0.37 dL/g, ash residue of 5.8 weight percent, diethylene glycol content of 9 mole percent, and low shear melt viscosity at 280° C. of 100×10$^3$ P. After solid state polymerization for 8 hours, the composite had I.V. of 0.53 dL/g and low shear melt viscosity at 280° C. of 125×10$^3$ P. Film prepared from this composite had oxygen permeability of 6.0 cc-mil/100in2-day-atm, Young's modulus of 2.5 GPa, and tensile strength of 31 MPa.

Example 63

This example illustrates the use of diacids other than terephthalic acid. The procedures of Examples 51 and 52 were followed except that the appropriate amount of dimethyl napthalate was used instead of dimethyl terephthalate. The final composite had I.V. of 0.96 dL/g, ash residue of 1.3 weight percent, and diethylene glycol content of 12 mole percent. Film prepared from this composite had oxygen permeability of 2.3 cc-mil/100in$^2$-day-atm and. Young's modulus of 1.70 GPa.

Example 64

The procedure of Examples 63 was followed except that the amount of organocation modified layered particle from Example 1 was increased to about 5 weight percent. The final composite had I.V. of 0.90 dL/g, ash residue of 2.8 weight percent, and diethylene glycol content of 5 mole percent. Film prepared from this composite had oxygen permeability of 1.6 cc-mil/100in$^2$-day-atm and Young's modulus of 2.01 GPa.

Comparative Example 4

The procedure of Example 63 was followed except that no organocation modified layered particle was used. The clay-free PEN material had I.V. of 0.96 dL/g and diethylene glycol content of 2 mole percent. Film prepared from this PEN had oxygen permeability of 3.1 cc-mil/100in$^2$-day-atm and Young's modulus of 1.67 GPa.

Example 65

The procedure of Example 14 was followed except that the clay used was Kanunpia-F (from Kunimine Ind.). The organocation modified layered particle product exhibited a basal spacing by X-ray diffraction of 1.73 nm and an ash residue of 78 weight percent.

Example 66

This procedure illustrates the detrimental formation of ether units that can occur. The procedure of Example 16 was followed except that 5 weight percent of the organocation modified layered particle from Example 65 was used instead of 2 weight percent of the organocation modified layered particle from Example 12. The polyester/organocation modified layered particle composite had I.V. of 0.39 dL/g and diethylene glycol content of 30 mole percent. This polyester/organocation modified layered particle composite could not be crystallized sufficiently to permit solid state polymerization by the procedure of Example 17 without sticking.

Example 67

This example illustrates some process variables for the melt phase and solid state polymerization procedures and their effect on product I.V. and diethylene glycol content. The procedure of Example 66 was repeated except that (1) the only catalysts are 65 ppm of zinc and 230 ppm of antimony (no other additives are used), (2) the maximum temperature of the melt phase polymerization was 265° C., which was maintained for 90 minutes, including 20 minutes to achieve full vacuum, (4) the solid state polymerization was conducted in a flask immersed into a heated metal bath using vacuum instead of dynamic nitrogen, and (5) the temperature profile for solid state polymerization was 1 hour at 230° C. and 3.5 hours at 240° C. The precursor had an I.V. value of 0.45 dL/g and an ash residue of 2.5 weight percent. The final composite had an I.V. of 0.65 dL/g, glass transition temperature of 65° C., melting point of 247° C., and diethylene glycol content of 11 mole percent. The oxygen permeability of a 10-mil film of this composite was determined to be 5.6 cc-mil/100in$^2$-day-atm.

Example 68

The procedure of Example 67 was repeated except that the organocation modified layered particle from Example 3 was used instead of the organocation modified layered particle from Example 65. The final composite had I.V. of 0.60 dL/g, ash residue of 4.4 weight percent, glass transition temperature of 71° C., melting point temperature of 255° C., and diethylene glycol content of 5 mole percent. The oxygen permeability of a 10-mil film of this composite was determined to be 6.0 cc-mil/100in$^2$-day-atm.

Example 69

The procedure of Example 12 was repeated, except that the clay used is a calcium montmorillonite refined from a bentonite deposit in Slovakia and was reported to have a cation exchange capacity of 121 milliequivalents per 100 grams.

Example 70

The procedure of Example 69 was repeated except that the amine used was dodecylamine and the clay used was Sumecton-SA, which is a commercial synthetic sodium saponite from Kunimine Ind. Co. and is reported to have a cation exchange capacity of 70 milliequivalents per 100 grams.

Example 71

The procedure of Example 67 was repeated except that the organocation modified layered particle from Example 70 was used instead of the organocation modified layered particle from Example 65. The final composite had I.V. of 0.63 dL/g, ash residue of 4.3 weight percent, glass transition temperature of 75° C., melting point temperature of 250° C., and diethylene glycol content of 4 mole percent.

Example 72

The procedure of Example 67 was repeated except that the organocation modified layered particle from Example 69 was used instead of the organocation modified layered particle from Example 53. The final composite had I.V. of 0.57 dL/g and ash residue of 2.8 weight percent.

Example 73

This example illustrates the solid state polymerization of a very low I.V. precursor that was prepared using dynamic nitrogen atmosphere only during the melt phase polymerization step. The procedure of Example 52 was repeated except that the precursor material used was the material from Example 53, which had an I.V. of 0.16 dL/g, and the solid state polymerization time was 48 hours. The final composite had an I.V. value of 0.55 dL/g and a low shear melt viscosity at 280° C. of $330 \times 10^3$ P.

Comparative Examples 5–7

PET 9921, which is a commercial polyester with I.V of about 0.72 and comprising about 4 mole percent cyclohexane dimethanol residues (based on 100 percent glycols) available from Eastman Chemical Company, was ground to pass a 6 mm screen. Three dry-blended mixtures with a total weight of about 400 grams containing about 4, 10, and 16 weight percent of the organoclay from Example 12 and the above ground PET 9921 were dried overnight in a vacuum oven at 105° C. then compounded using a Leistritz Micro 18 extruder at 275° C. with a die temperature of 280° C. employing a general compounding screw at a rate of 250 rpm. The extrudates were pelletized and characterized. These polyester-platelet materials were crystallized, dried overnight in a vacuum oven at 105° C., then solid state polymerized in a glass solid stating unit with a nitrogen purge of 14 scfh and heated by boiling diethyl succinate (boiling point of about 218° C.) for 16 hours. The final polyester-platelet composite were characterized. TEM images show the presence of mostly aggregates with thickness less than about 20 nm and few individual platelets.

Films with thickness of 10 mils were compression molded and tested for oxygen permeability. The results presented in Table 7 show that the permeability of these films does not decrease with increasing loading of organoclay and are indicative of poor delamination and/or dispersion of the organoclay into the PET matrix. These examples show that, unlike the process of this invention, extrusion compounding PET with organoclay does not provide a significant barrier improvement.

TABLE 7

| Comparitive Example | I.V. (dL/g) | Ash (wt %) | Permeability (cc-mil/100 in²-day-atm) |
| --- | --- | --- | --- |
| 5 | 0.70 | 1.5 | 10.1 |
| 6 | 0.52 | 5.8 | 10.4 |
| 7 | 0.51 | 4.4 | 10.1 |

We claim:

1. A composition comprising at least one melt-processible polyester having dispersed therein between about 0.01% and about 25 weight %, based on the weight of the composition of swellable layered clay material comprising platelet particles intercalated with at least one polyalkoxylated ammonium salt comprising at least one polyalkoxylated group consisting of greater than 5 repeating alkyl oxide groups.

2. The composition of claim 1 wherein said at least one polyalkoxylated ammonium salt comprises poly (oxyalkylene[n]) groups in which the alkylene unit comprises 2 to 6 carbon atoms and n is between at least about 5 and about 200.

3. The composition of claim 1 wherein said platelet particles are derived from layered platelet materials having a cation exchange capacity between about 0.3 and about 3.0 milliequivalents per gram of mineral.

4. The composition of claim 3 wherein said layered platelet materials comprise exchangeable cations between layers of individual platelets.

5. The composition of claim 4 wherein said exchangeable cations are selected from the group consisting of alkaline metals, alkaline earth metals, and mixtures thereof.

6. The composition of claim 4 wherein said exchangeable cations are exchanged for onium ion.

7. The composition of claim 1 wherein the platelet particles comprise a thickness of less than about 2 nm and a diameter between about 10 to about 1000 nm.

8. The composition of claim 5 wherein said layered platelet material is selected from the group consisting of natural, synthetic, and modified phyllosilicate.

9. The composition of claim 8 wherein said layered platelet material is selected from the group consisting of smectite clay, synthetic clay, modified clay, chalcogens and a mixture thereof.

10. The composition of claim 8 wherein said layered platelet material is selected from the group consisting of montmorillonite, saponite, hectorite, mica, vermiculite, bentonite, nontronite, beidellite, volkonskoite, sauconite, magadite, kenyaite, synthetic mica, synthetic saponite, and synthetic hectorite, fluoronated montmorillonite and a mixture thereof.

11. The composition of claim 8 wherein said layered platelet material is selected from the group consisting of phyllosilicates of the 2:1 type having a cation exchange capacity of 0.5 to 2.0 meq/g.

12. The composition of claim 8 wherein said layered platelet material is selected from the group consisting of bentonite, montmorillonite and a mixture thereof.

13. The composition of claim 9 wherein said layered platelet material is selected from the group consisting sodium bentonite, sodium montmorillonite and a mixture thereof.

14. The composition of claim 1 wherein said at least one polyalkoxylated ammonium salt comprises a compound of the Formula I

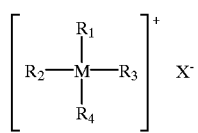

wherein $R_1$ and $R_2$ are independently selected from the group consisting of hydrogen, linear or branched alkyl groups having 1 to 22 carbon atoms, aralkyl groups selected from the group consisting of benzyl, substituted benzyl moieties, substituted and unsubstituted aryl groups, fused ring aromatic substituents, and beta, gamma unsaturated groups having six or less carbon atoms or hydroxyalkyl groups having 2 to 6 carbon atoms; wherein M is nitrogen, $R_3$ and $R_4$ are independently selected from the group consisting of H or substituted or unsubstituted hydroxy terminated polyoxyalkalenes wherein the alkyl part comprises 2 to 6 carbon atoms and the number of repeat oxyalkalene units in each R group is between 2 and 100; and $X^-$ represents an anion selected from the group consisting of halogen, hydroxide, or acetate anion.

15. The composition of claim 14 wherein said aralkyl is selected from the group consisting of fused ring moieties having linear chains or branches of 1 to 22 carbon atoms in the alkyl portion of the structure.

16. The composition of claim 15 wherein said anion is chloride or bromide.

17. The composition of claim 1 wherein said at least one polyalkoxylated ammonium salt is selected from the group consisting of octadecyl methyl bis(polyoxyethylene[15]) ammonium chloride and octadecyl bis(polyoxyethylene [15])amine.

18. The composition of claim 1 wherein said at least one polyalkoxylated ammonium.

19. A process for forming a composition comprising the steps of (i) treating between about 0.01% and about 25 weight %, based on the weight of the composition, of a swellable layered clay material comprising platelet particles with at least one polyalkoxylated ammonium salt comprising at least one polyalkoxylated group consisting of greater than 5 repeating alkyl oxide groups to form treated platelet particles, said treating step comprises dispersing said layered particle material comprising metal cations in water at a temperature between about 50 and 80° C., adding said at least one organic cation salt comprising organic to said cations to said dispersion, blending for period of time sufficient for the organic cations to exchange most of the metal cations and isolating said treated platelet particles and (ii) incorporating the treated platelet particles in a melt-processible polyester.

20. The process of claim 19 wherein said at least on polyalkoxylated ammonium salt comprises a compound of the Formula I

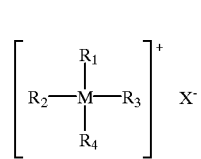

wherein $R_1$ and $R_2$ are independently selected from the group consisting of hydrogen, linear or branched alkyl groups having 1 to 22 carbon atoms, aralkyl groups selected from the group consisting of benzyl, substituted benzyl moieties, substituted and unsubstituted aryl groups, fused ring aromatic substituents, and beta, gamma unsaturated groups having six or less carbon atoms or hydroxyalkyl groups having 2 to 6 carbon atoms; wherein M is nitrogen, $R_3$ and $R_4$ are independently selected from the group consisting of H or substituted or unsubstituted hydroxy terminated polyoxyalkalenes wherein the alkyl part comprises 2 to 6 carbon atoms and the number of repeat oxyalkalene units in each R group is between 2 and 100; and $X^-$ represents an anion selected from the group consisting of halogen, hydroxide, or acetate anion.

21. The composition of claim 1 wherein said at least polyalkoxylated ammonium salt comprises poly (oxyalkylene) groups in which the alkylene unit comprises 2 to 6 carbon atoms and n is between at least about 2 and about 200.

22. The process of claim 20 wherein said at least one polyalkoxylated ammonium salt is added neat or dissolved in water or an alcohol.

23. The process of claim 20 wherein said at least one polyalkoxylated ammonium salt is added in an amount between about 1 equivalent to about 3 equivalents.

24. The process of claim 23 wherein said at least one polyalkoxylated ammonium salt is added in an amount between about 1.1 to 2 equivalents.

25. The process of claim 23 wherein said at least one polyalkoxylated ammonium salt is added in an amount between about 1.1 to about 1.5 equivalents.

26. The process of claim 19 wherein said platelet particles have an average particle size of less than about 100 micron in diameter.

27. The process of claim 19 wherein said platelet particles have an average particle size of less than about 50 micron in diameter.

28. The process of claim 19 wherein said platelet particles have an average particle size of less than about 20 micron in diameter.

* * * * *

UNITED STATES PATENT AND TRADEMARK OFFICE
CERTIFICATE OF CORRECTION

PATENT NO. : 6,071988
DATED : June 6, 2000
INVENTOR(S) : Robert Boyd Barbee, James Christopher Matayabas, Jr., John Walker Gilmer It is certified that error appears in the above-identified patent and that said Letters Patent is hereby corrected as shown below:

Column 20,
Line 14: please insert a comma (,) after the word "composition."

Column 21,
Line 36: please insert the phrase -- salt is octadecyl methyl bis(polyoxyethylene [15]) ammonium chloride -- after the word "ammonium" and prior to the period(.).
Line 48: please insert the word --cations -- after the word "organic" and prior to the word "to";
Lines 48-49: please delete the phrase "to said cations";
Line 49: please insert the word -- a -- after the word "for" and prior to the word "period."

Column 22,
Lines 26-27: please insert the word -- one -- after the word "least" and prior to the word "polyalkoxylated."
Line 28: please delete "(olyalkylene) groups" and substitute therefor -- (oxyalkylene[n]) groups --.

Signed and Sealed this

Seventh Day of August, 2001

*Attest:*

Nicholas P. Godici

NICHOLAS P. GODICI
*Attesting Officer*    *Acting Director of the United States Patent and Trademark Office*